(12) United States Patent
Ramraika et al.

(10) Patent No.: US 10,029,753 B2
(45) Date of Patent: Jul. 24, 2018

(54) DEVICE FOR ENHANCED SAFETY IN USING A SIDE STAND FOR PARKING OF TWO WHEELED VEHICLE

(71) Applicant: STAR ENGINEERS (I) PVT. LTD., Pune, Maharashtra (IN)

(72) Inventors: Divya Ramraika, Pune (IN); Saurabh Madhu, Pune (IN)

(73) Assignee: STAR ENGINEERS (I) PVT. LTD., Pune (IN)

(*) Notice: Subject to any disclaimer, the term of this patent is extended or adjusted under 35 U.S.C. 154(b) by 0 days.

(21) Appl. No.: 15/372,860

(22) Filed: Dec. 8, 2016

(65) Prior Publication Data

US 2017/0151992 A1 Jun. 1, 2017

Related U.S. Application Data

(63) Continuation of application No. 14/755,003, filed on Jun. 30, 2015, now abandoned.

(30) Foreign Application Priority Data

Jul. 2, 2014 (IN) .......................... 2141/MUM/2014

(51) Int. Cl.
*B62J 27/00* (2006.01)
*B62H 1/02* (2006.01)

(52) U.S. Cl.
CPC ................ *B62J 27/00* (2013.01); *B62H 1/02* (2013.01)

(58) Field of Classification Search
CPC ................ B62H 1/02; B62J 27/00; B62J 3/00
See application file for complete search history.

(56) References Cited

U.S. PATENT DOCUMENTS

| | | | | |
|---|---|---|---|---|
| 2,595,193 A * | 4/1952 | Haug | ........................ | B62H 1/02 280/301 |
| 4,016,538 A * | 4/1977 | Miller | ........................ | B62H 1/02 280/293 |
| 4,241,933 A * | 12/1980 | Gratza | ........................ | B62H 1/02 180/219 |
| 4,655,472 A * | 4/1987 | Pletscher | ................. | B62H 1/02 248/168 |
| 4,883,284 A * | 11/1989 | Nakazawa | ............... | B62H 1/02 180/219 |
| 4,971,347 A * | 11/1990 | Cline | ........................ | B62H 1/02 280/301 |
| 4,976,452 A * | 12/1990 | Fujita | ........................ | B62H 1/02 280/293 |
| 5,388,848 A * | 2/1995 | Silva | ........................ | B62H 1/06 280/300 |
| 5,886,349 A * | 3/1999 | Su | ........................... | B62H 1/00 180/219 |
| 6,323,643 B1 * | 11/2001 | Kordecki | ............... | G01D 5/145 324/207.2 |
| 6,367,337 B1 * | 4/2002 | Schlabach | ................ | B62D 6/10 180/443 |
| 6,536,792 B2 * | 3/2003 | Strasser | ................ | B62H 5/005 280/293 |
| 6,733,025 B2 * | 5/2004 | Su | ........................... | B62H 1/02 180/219 |

(Continued)

*Primary Examiner* — Jacob D Knutson
(74) *Attorney, Agent, or Firm* — The Roy Gross Law Firm, LLC; Roy Gross

(57) ABSTRACT

A device for providing improved safety in using a side stand for parking the two wheeled vehicle is disclosed.

6 Claims, 12 Drawing Sheets

(56) References Cited

U.S. PATENT DOCUMENTS

| | | | |
|---|---|---|---|
| 7,631,885 B2* | 12/2009 | Safarik | B62H 1/02 280/293 |
| 8,003,903 B2* | 8/2011 | Nakazawa | B62H 1/02 200/11 D |
| 2002/0017417 A1* | 2/2002 | Strasser | B62H 1/02 180/287 |
| 2002/0171538 A1* | 11/2002 | Su | B62J 27/00 340/441 |
| 2004/0212172 A1* | 10/2004 | Nakazawa | B62H 1/02 280/293 |
| 2005/0179229 A1* | 8/2005 | Ridley | B62H 1/02 280/301 |
| 2007/0200315 A1* | 8/2007 | Ogawa | B62H 1/02 280/293 |
| 2009/0212532 A1* | 8/2009 | Kudo | B62H 1/02 280/301 |
| 2012/0074667 A1* | 3/2012 | Matsushima | B62J 25/00 280/291 |
| 2015/0217822 A1* | 8/2015 | Sturdevant | B62H 1/02 280/298 |

* cited by examiner

DEVICE FOR ENHANCED SAFETY IN USING A SIDE STAND FOR PARKING OF TWO WHEELED VEHICLE

FIELD OF THE INVENTION

The present invention relates to two wheeler stands. In particular, this invention relates to a device for providing improved safety in using a side stand for parking the two wheeled vehicle.

BACKGROUND OF THE INVENTION

Support stands are typically used to position a two wheeled vehicle in stationary position when not being driven by a rider. These stands have to be pushed open or extended from a closed inactive position to an open active position adapted to support the weight of the vehicle in a parked state. There are two types of stands commonly used to park a two wheeler. One of these stands is a side stand and the other is a centre stand. Both are provided between the wheel centers. To park a two wheeler using a stand, the support unit of the stand has to be swiveled to an open position and the vehicle pulled backwards or tilted to one side to achieve a parked stationary position.

The centre stand of a two wheeler keeps the vehicles while parked, in plane normal to the ground level as compared to a slightly tilted position achieved while using a side stand. Both these stands are provided with stoppers to limit the movement of the stand with reference to the vehicle frame. A typical side stand for a two wheeler consists of bracket fastened to the frame of the vehicle, between the front wheel and rear wheels. The bracket is provided with a pivoted joint consisting of a swiveling support leg assembly. A spring is used to keep the leg assembly in a substantially horizontal position raised and away from the ground level, to prevent the stand from accidentally opening whilst the vehicle is in motion. Starting and riding a two wheeler with the side stand in a deployed state can lead to accidents and injuries to the rider and also to the bystanders.

Various attempts have been made to alert the rider about the deployed state of the side stand support either by preventing engine start or alarms.

U.S. Pat. No. 4,016,538 discloses a "Safety device for a motorcycle". This device actuates the horn of a motorcycle if the side stand is down, the ignition is on, and the motorcycle is in the driving position using a mercury contact switch which is activated by the tilted position of the motor cycle when parked using a side stand and another switch mechanically connected to the stand. The horn is activated when the driver turns the ignition and brings the motor cycle to a substantially vertical position without putting up the side stand. The use of contact type switches and mercury filled position switch, acting in unison, to activate a sound alarm, is subject to wear and tear due to physical contact, electrical arcing, leakage of mercury and abrasion due to inclusion of dust particles.

U.S. Pat. No. 6,733,025 discloses a "Motorcycle stand control mechanism". This is a motorcycle stand control device having a rotor adapted to rotate when the wheels of the motorcycle is rotating. The rotor is provided with a set of magnets alternatively arranged around the periphery of the rotor and a circuit board having sensor adapted to act with the magnets and to output a corresponding control signal to turn the motorcycle stand of the motorcycle subject to the status of the rotary driven member. This device consists of many mechanical components like rotating wire positioned in a flexible cable to transmit the drive, direct current motor and gear drive to retract the side stand leg support. All these components are subject to high degree of mechanical wear and tear and the components that are exposed to the road surface and are likely to be damaged in inclement weather conditions and also not suitable for rough and rocky terrains.

U.S. Pat. No. 6,918,607 discloses a "Side stand device". This device consists of a rotary switch which attempts to prevent transmission of vibrations from a body frame to a rotary switch to reliably maintaining the function and performance of the rotary switch. The rotary switch is provided in coaxial relationship with the side stand through a pivot bolt and a securing bolt. A sheet is interposed between the rotary switch and the pivot bolt, and a tube and a sheet are interposed between the rotary switch and the securing bolt. The sheets and the tube are formed from rubber members. A cushion member is interposed between an engaging member of an inner rotor in the rotary switch and a locking hole of the side stand. The cushion member is formed from a rubber member. The cushioning members and the contacts of the rotary switch are subject to wear and tear and are likely to be damaged in regular use and have to be replaced during periodic maintenance.

U.S. Pat. No. 7,631,885 discloses an "Intelligent interlock for a motorcycle stand". This device consists of a side stand movable between an extended position in which the stand supports the motorcycle and a retracted position. The motorcycle includes a sensor to generate a signal to indicate the extended or retracted position of the side stand; a gear position sensor to generate signal about the neutral state or the non-neutral state of the transmission gears; a vehicle speed sensor to detect the speed of the motorcycle and a controller programmed for monitoring of the stand signal and for preventing operation of the engine when one of the gear position sensor and the vehicle speed sensor fails to communicate successfully with the controller, preventing operation of the engine being dependent upon the stand signal and an output of the other of the gear position sensor and the vehicle speed sensor. The stand position sensor is a Hall-effect sensor mounted externally and operates to sense the presence of the side stand in the retracted position by sensing a magnet or ferrous material of the side stand. The use of three different sensors and external mounting of the stand position sensor are likely to be damaged in inclement weather conditions, presence of magnets or ferrous particles and are also not suitable for rough and rocky terrains.

Thus, there is a need for a device that warns the rider about the deployed condition of the side stand before he starts to ride the vehicle and which overcomes the problems hitherto encountered in a two wheeler having a side stand arrangement.

OBJECTS OF THE PRESENT INVENTION

An object of this invention is to provide a device that improves safety in using a side stand for parking the two wheeled vehicle.

Still another object of this invention is to provide a safety device that positively indicates the deployment of the side stand of a two wheeler.

Yet another object of this invention is to provide a safety device that is adapted to function even in adverse atmospheric conditions and in inclement weather.

Yet another object of this invention is to provide a safety device that is free from wear and tear of the components and adapted to function accurately repeatedly.

Yet another object of this invention is to provide a safety device that can function even at high ambient temperatures.

Yet another object of this invention is to provide a safety device that is easy to install.

Yet another object of this invention is to provide a safety device that does not require periodic servicing or maintenance to be carried out.

BRIEF DESCRIPTION OF ACCOMPANYING DRAWINGS

All aspects and advantages of the present invention will become apparent with the description of the preferred non limiting embodiment, when read together with the accompanying drawings, in which.

SUMMARY OF THE INVENTION

Figure 1:
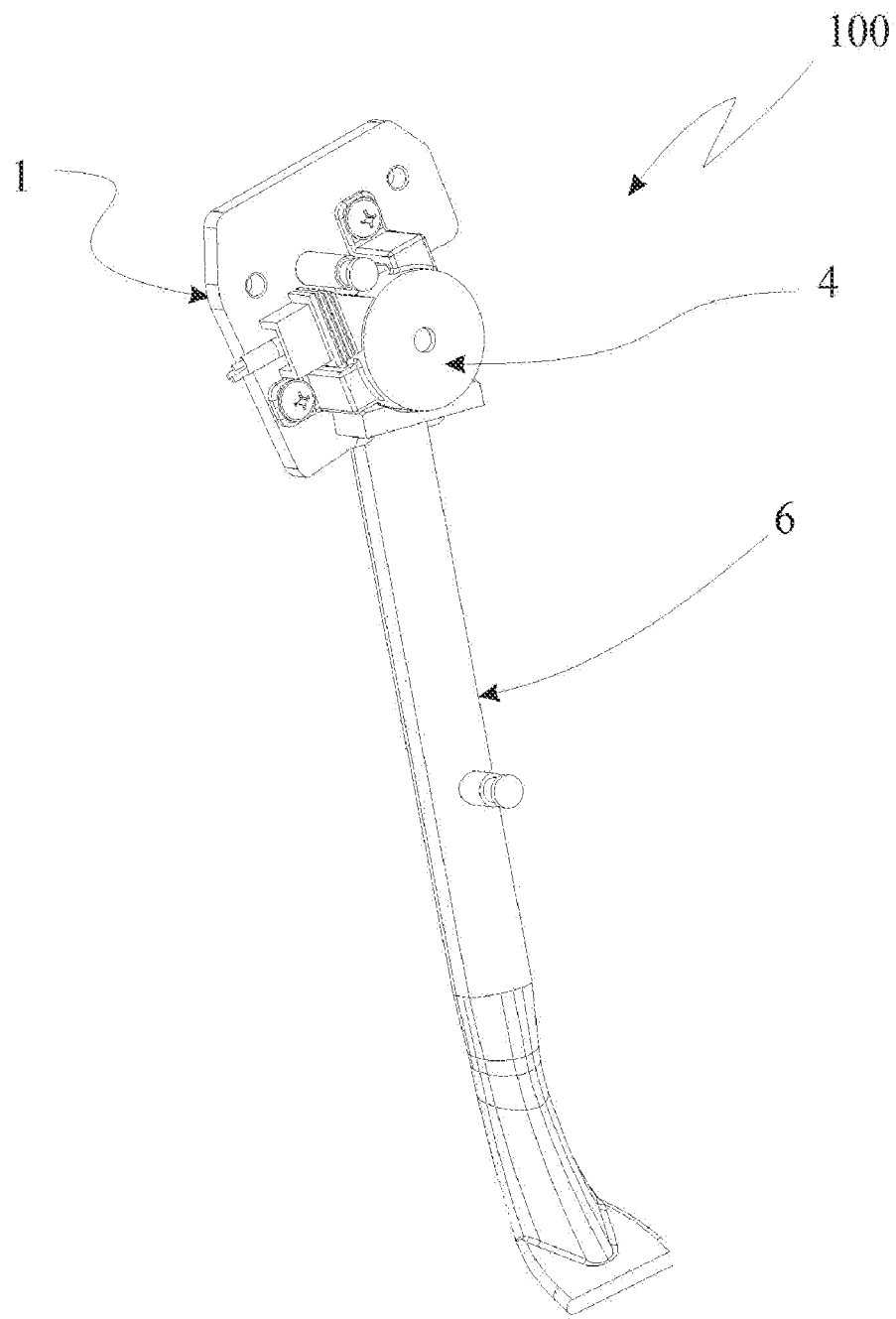
FIG. 1 is the three dimensional view of the side stand of a two wheeler provided with the safety device in accordance with this invention, depicted in an operative position of the side stand.

According to this invention there is provided a safety device for a side stand mounted on a two wheeled vehicle, said device comprising:

a base plate adapted to be fastened to the frame of the two wheeler between the wheels centers, said base plate provided with specific peripheral cut out having two edges defining an included angle "X" between said edges; a holding member defining a first surface, an integral coaxial annular disc, a circular cavity and an arcuate cut out; said holding member pivot-ably mounted on the base plate; a move-able element rigidly mounted on said first surface of the holding member; a housing comprising a circular disc having an integral circular side wall defining a cavity provided with a central cylindrical projection normal to the circular disc; said central cylindrical projection defining at least three cylindrical locating regions; said circular disc provided with at least two spaced apart locating pins; said housing removably fastened to the base plate; an integrated circuit unit comprising a sensor unit, resistors-capacitors and pad connector points; said integrated circuit unit provided at least two mounting locations; in an assembled configuration the integrated circuit unit adapted to mount in said housing so as maintain specific orientation and locational accuracy with reference to the first locating region, mounting locations and said locating pins; a support element pivot ably mounted on said base plate; said support element adapted to swivel from an inoperative closed position to an operative open position within the included angle "X" of edges and; a fastener element provided with a central cylindrical cavity adapted to pivot-ably fasten said holding member with reference to the base plate; in an assembled configuration the circular cavity of the holding member adapted to receive the one end of the fastener and the central cylindrical cavity adapted to locate the third locating region of the housing so as to maintain specific orientation and locational accuracy of said move-able member with reference to the sensor unit in a first inoperative swiveled close position and an operative swiveled open position of the of the support element.

Typically the included angle "X" is preferably more than 90 degrees but less than 125 degrees.

Typically the move able element is a permanent magnet selected from a group of permanent magnets consisting of Alnico, Samarium-Cobalt, Neodymium-Iron-Boron magnets.

Typically the integrated circuit unit is mounted on a rigid polymer base and covered with protective coating.

Typically the sensor unit is a programmable digital Hall effect sensor.

Typically the safety device of this invention is adapted to be retrofitted to a two wheeled vehicle.

DESCRIPTION OF THE INVENTION

The present invention relates to a safety device for the side stand of a two wheeler which overcomes the limitations hitherto encountered in existing devices employed for preventing accidents and injuries in using the side stand of the two wheeler.

Referring FIG. 1, the safety device for the side stand of a two wheeler in accordance with this invention is indicated generally by the reference numeral 100. The safety device for the side stand of a two wheeler (100) comprises a base plate (1) adapted to be fastened to the frame (not specifically shown) of the two wheeler between the wheels centers. The base plate (1) is provided with a pivot able support element (6). A housing (4) is provided to secure the components of the safety device (100).

Figure 2:
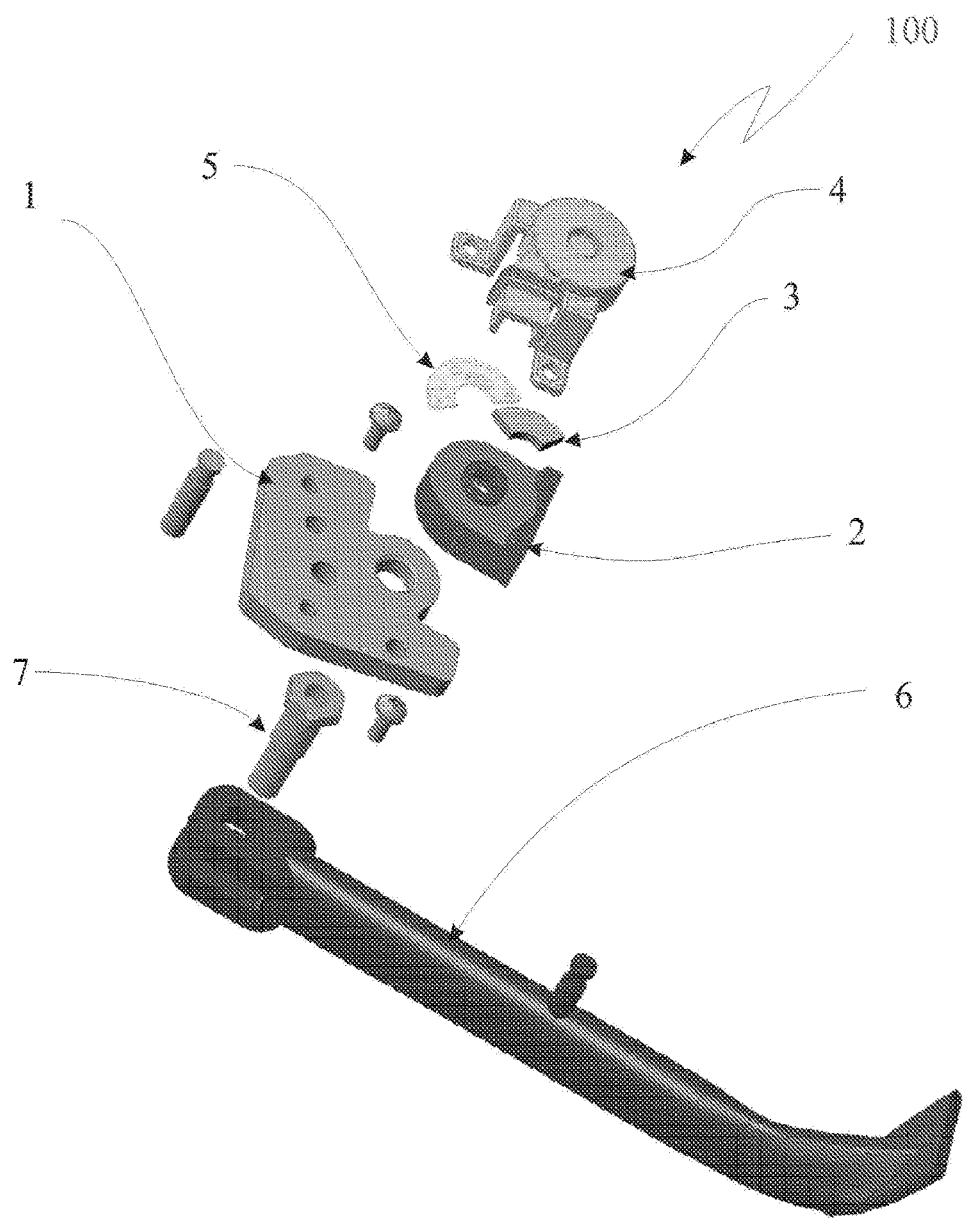
FIG. 2 is the exploded view of the side stand of a two wheeler provided with the safety device in accordance with this invention, as shown in FIG. 1.

FIG. 2 is the exploded view of the safety device for the side stand of a two wheeler(100) comprising base plate (1); a holding member (2); a move-able element (3); a housing (4); an integrated circuit unit (5); a support element (6); and a fastener element(7). The holding member (2) and the support element (6) are pivot ably secured to base plate (1) by the fastener element(7). The move-able element (3) is rigidly secured to the holding member (2). The integrated circuit unit (5) positioned within the housing (4). The housing (4) is removably fastened to the base plate (1) of the safety device for the side stand of a two wheeler (100).

Figures 3, 4:
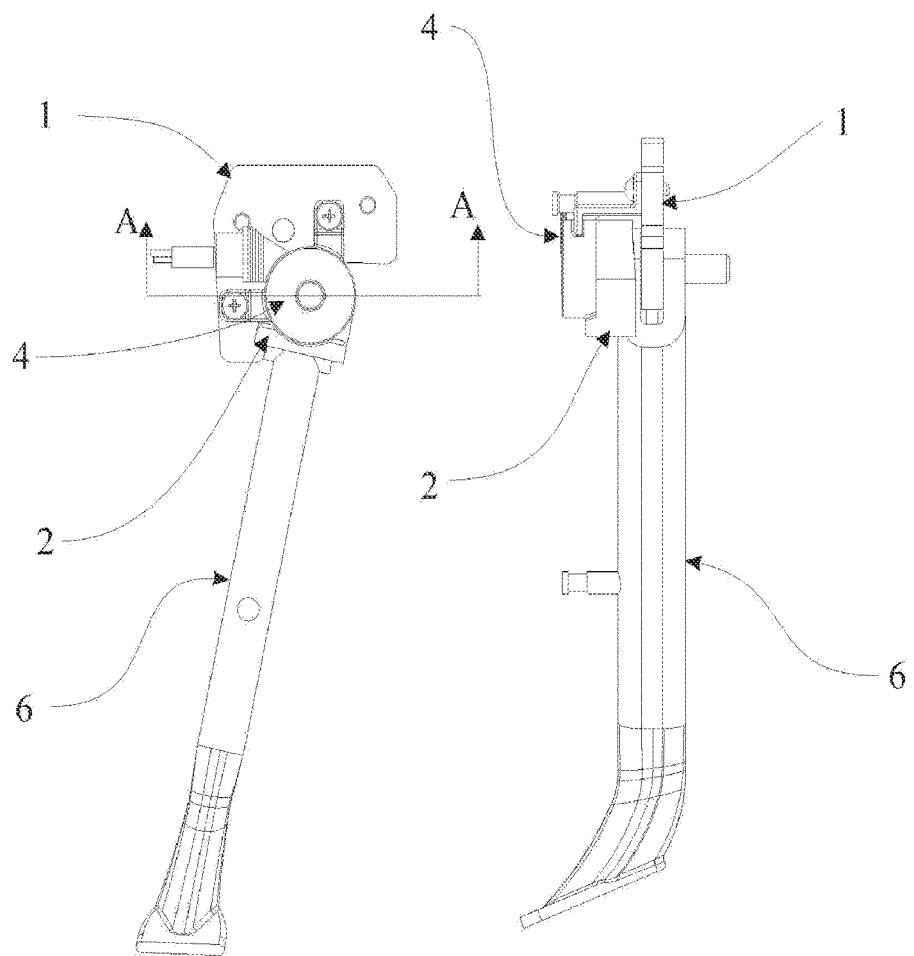
FIGS. 3 and 4 are the elevation and side elevation of the side stand of a two wheeler provided with the safety device in accordance with this invention, as shown in FIG. 1, depicted in an operative position of the side stand.
Figure 5:
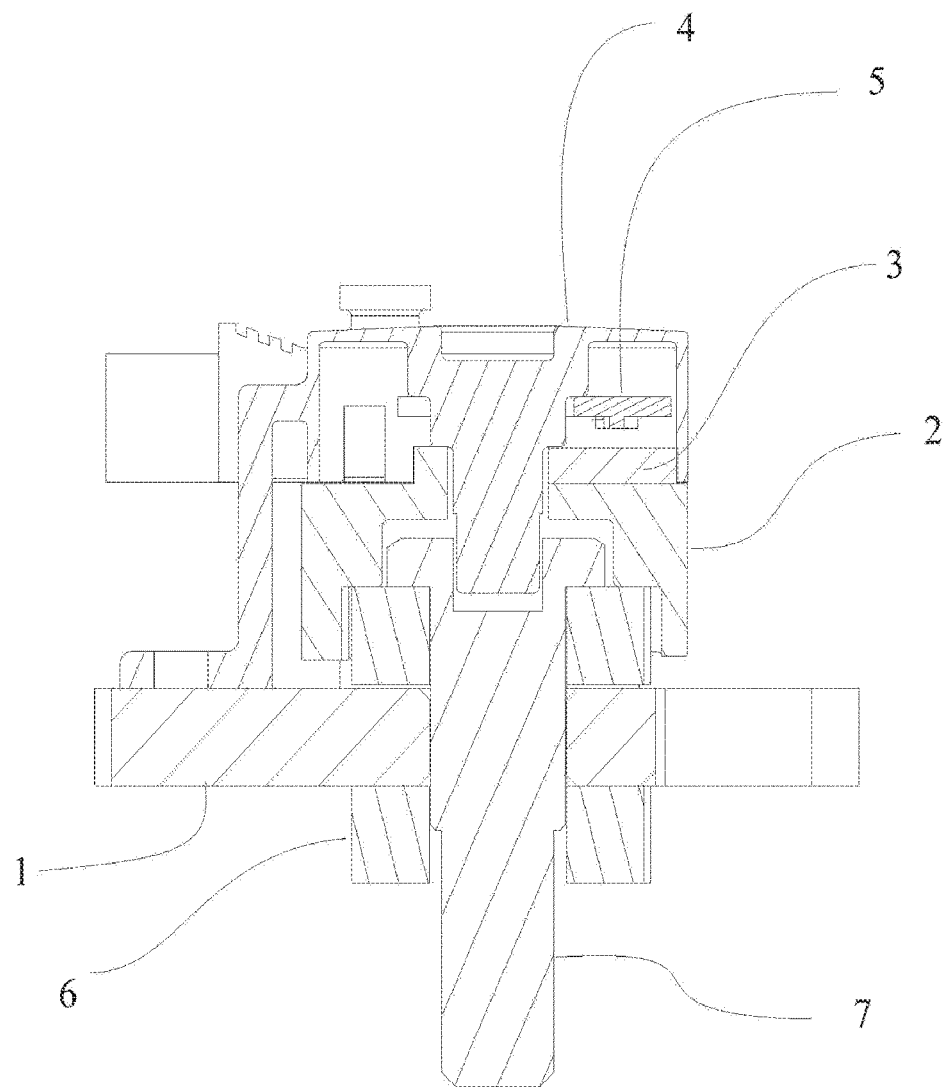
FIG. 5 is the sectional view of the side stand of a two wheeler provided with the safety device in accordance with this invention, as shown in FIG. 3, depicted in an operative position of the side stand.

Referring to FIGS. 3 and 4 the safety device for the side stand of a two wheeler (100) is in an operative swiveled open position of the support element (6). In this operative condition (refer FIG. 5) the move-able element (3) positioned in close proximity of the integrated circuit unit (5). A sensor (not specifically shown in this view) embedded in the integrated circuit unit (5) is adapted to sense the relative position of the move-able element (3) and generate an output signal to indicate of the operative swiveled open position of the support element (6).

Figure 6:
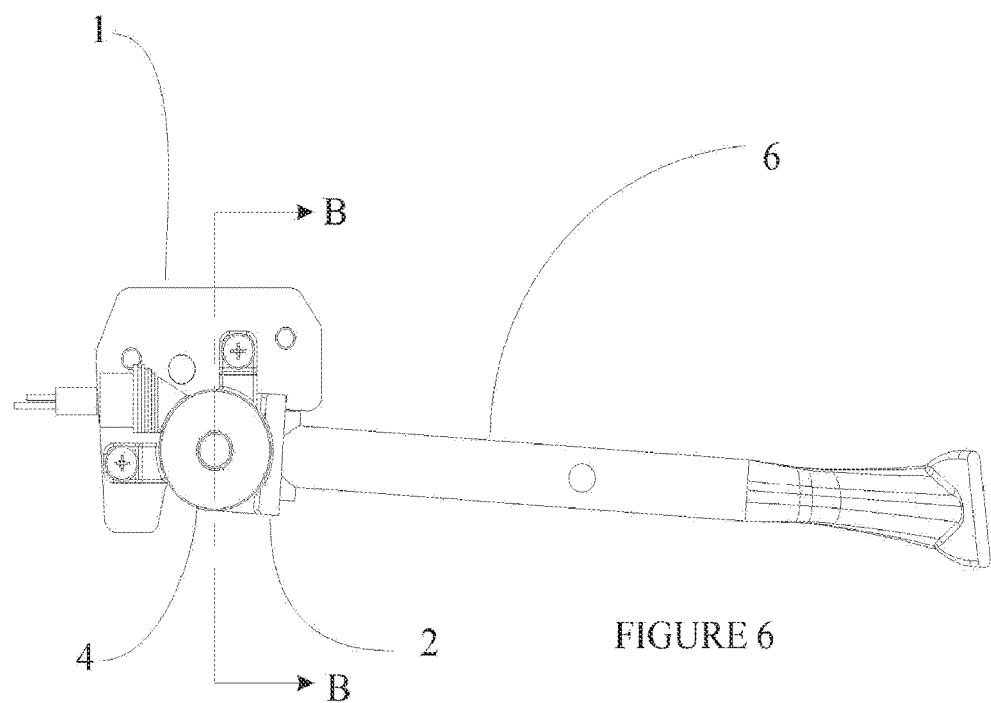
FIGS. 6 and 7 are the elevation and side elevation of the side stand of a two wheeler provided with the safety device in accordance with this invention, as shown in FIG. 1, depicted in an inoperative position of the side stand.
Figure 7:
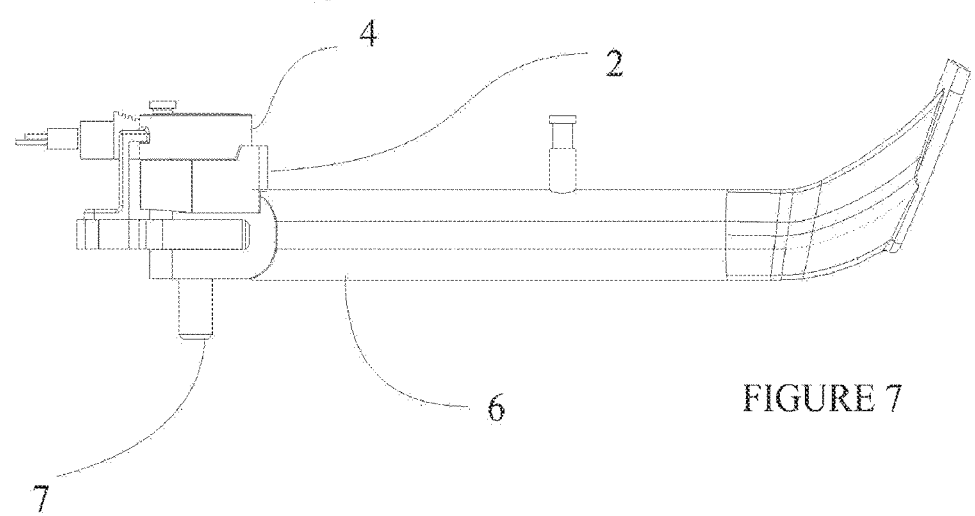
Figure 8:
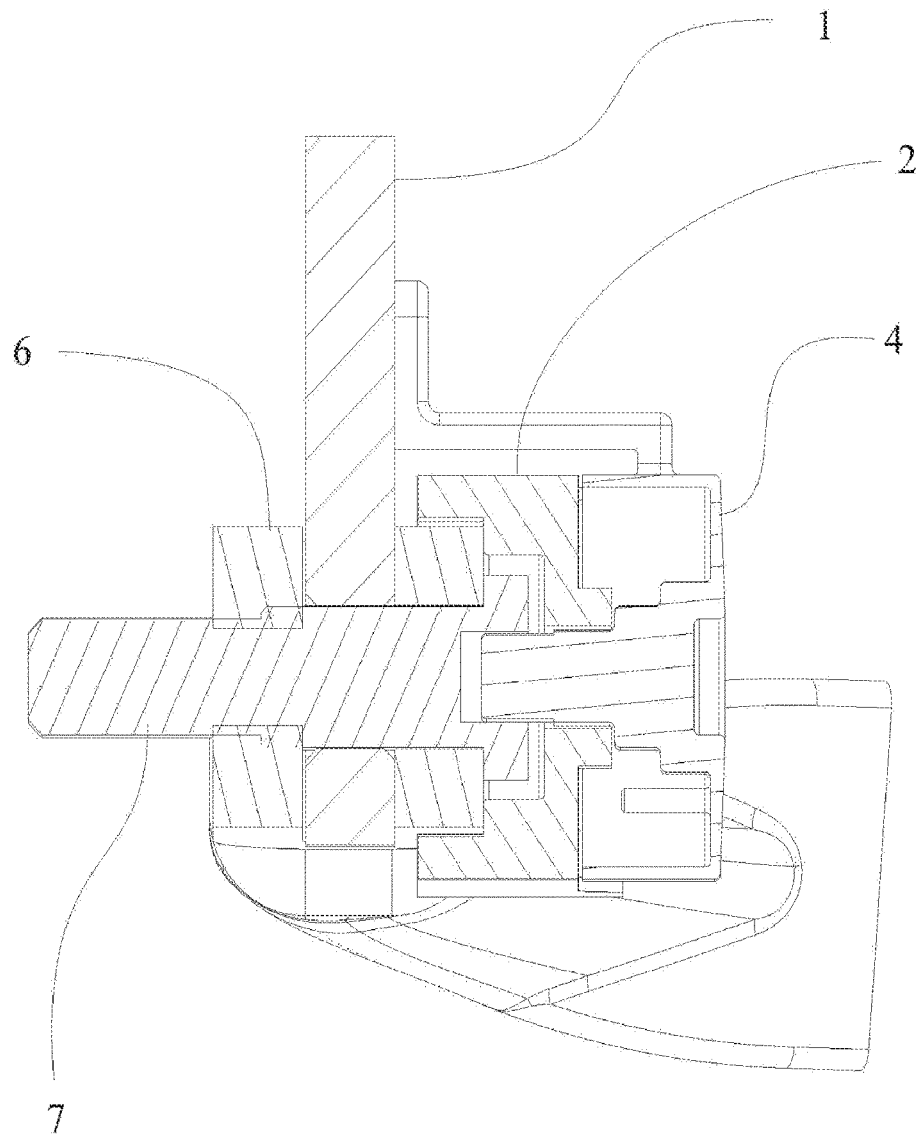
FIG. 8 is the sectional view of the side stand of a two wheeler provided with the safety device in accordance with this invention, as shown in FIG. 6, depicted in an inoperative position of the side stand.

Referring to FIGS. 6 and 7 the safety device for the side stand of a two wheeler (100) is in an inoperative swiveled close position of the support element (6). In this inoperative condition (refer FIG. 8) the move-able element (3) is positioned angularly displaced to be relatively away from the integrated circuit unit (5). The sensor (not specifically shown in this view) embedded in the integrated circuit unit (5) is adapted to sense the relative position of the move-able element (3) and generate an output signal to indicate of the inoperative swiveled closed position of the support element (6).

Figures 9, 10:
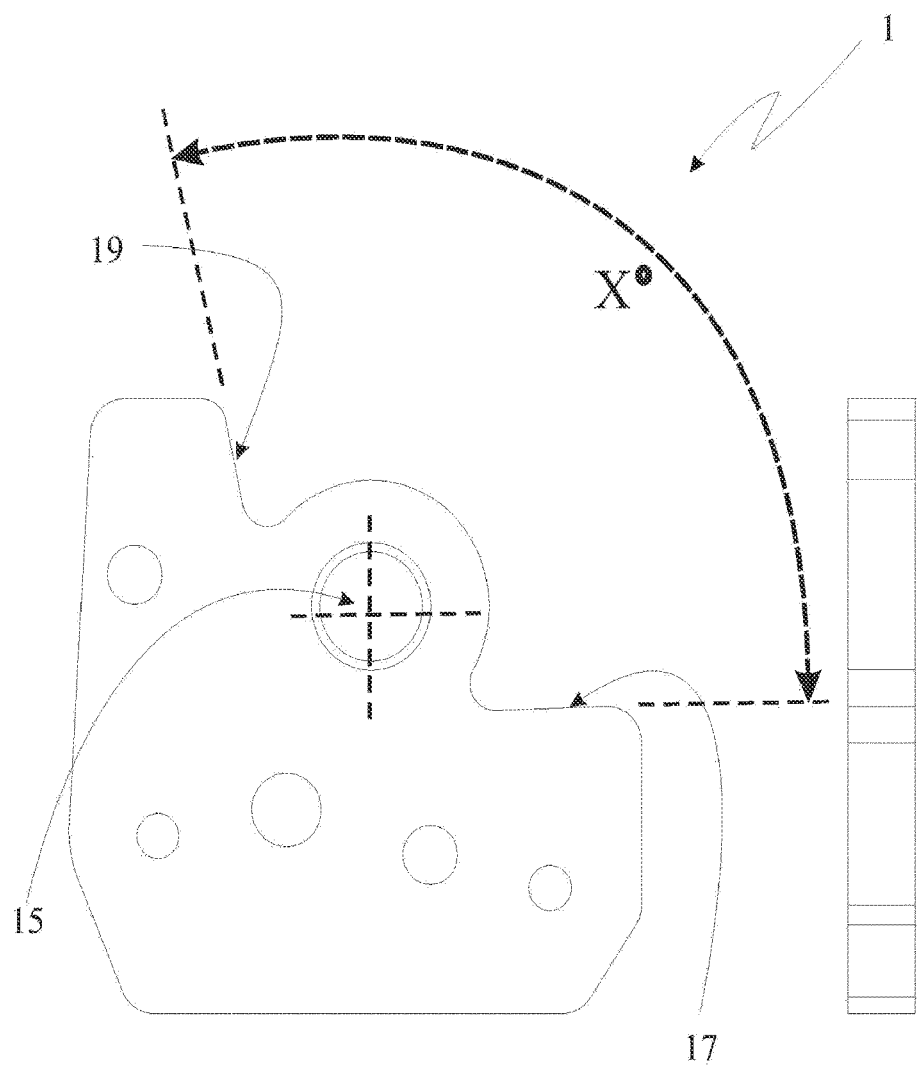
FIGS. 9 and 10 are the elevation and the end view of the base plate of the safety device in accordance with this invention as shown in FIG. 1.

Referring to FIGS. 9 and 10 the base plate (1) of the safety device for the side stand of a two wheeler (100) is provided with circular opening (15) adapted to receive the fastener element (7) (not specifically shown). The base plate (1) is also provided with specific peripheral cut out having two edges (17) and (19) defining an included angle "X" between said edges.

In an assembled operative condition of the safety device for the side stand of a two wheeler(100) the fastener element (7), the holding member (2) and the support element (6) (not specifically shown in these figures) are adapted to be angularly displaced with reference to the centre of said circular opening (15). Said displacement limited within the included angle "X" defined by edges (17) and (19).

Figure 11:
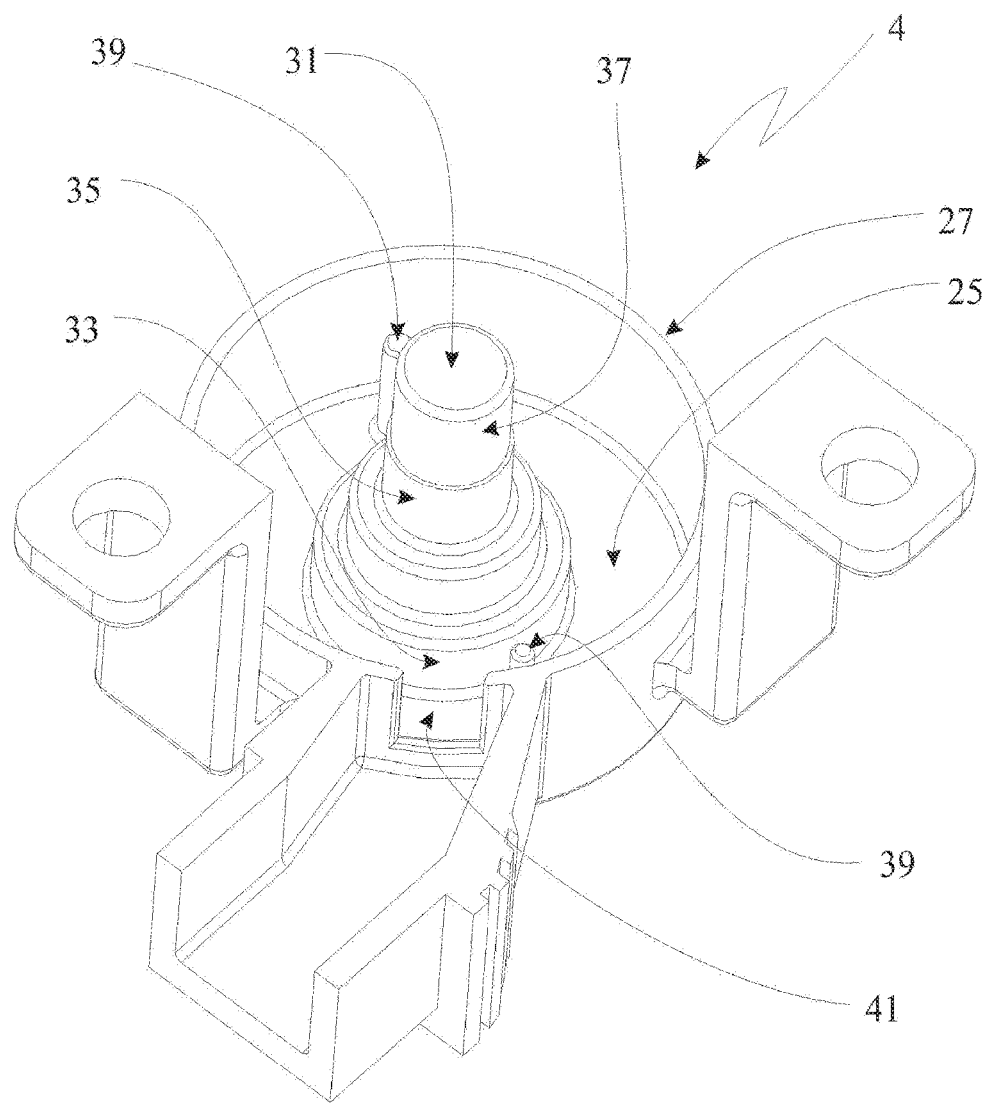
FIG. 11 is the three dimensional view of the housing of the safety device in accordance with this invention as shown in FIG. 1.

Referring to FIG. 11 the housing (4) of the side stand of a two wheeler(100) comprises of a circular disc (25) provided with an integral circular side wall (27) so as to define a cavity provided with a central cylindrical projection (31) normal to the circular disc (25). The central cylindrical projection (31) defining three cylindrical locating regions (33) (35) and (37) having different diameters. In an assembled operative condition of the safety device for the side stand of a two wheeler (100) the cylindrical locating regions (33) (35) and (37) are adapted to locate and position the integrated circuit unit (5), the holding member (2) and the fastener element (7) respectively, so as to maintain concentricity and air gap of the assembled components in an inoperative swiveled closed position and in an operative swiveled open position of the support element (6). Two spaced apart locating pins (39) provided on the circular disc (25) are adapted to locate the integrated circuit unit (5). The circular side wall (27) is provided with an ingress opening (41) for cable harness connection to the integrated circuit unit (5).

Figures 12, 13:
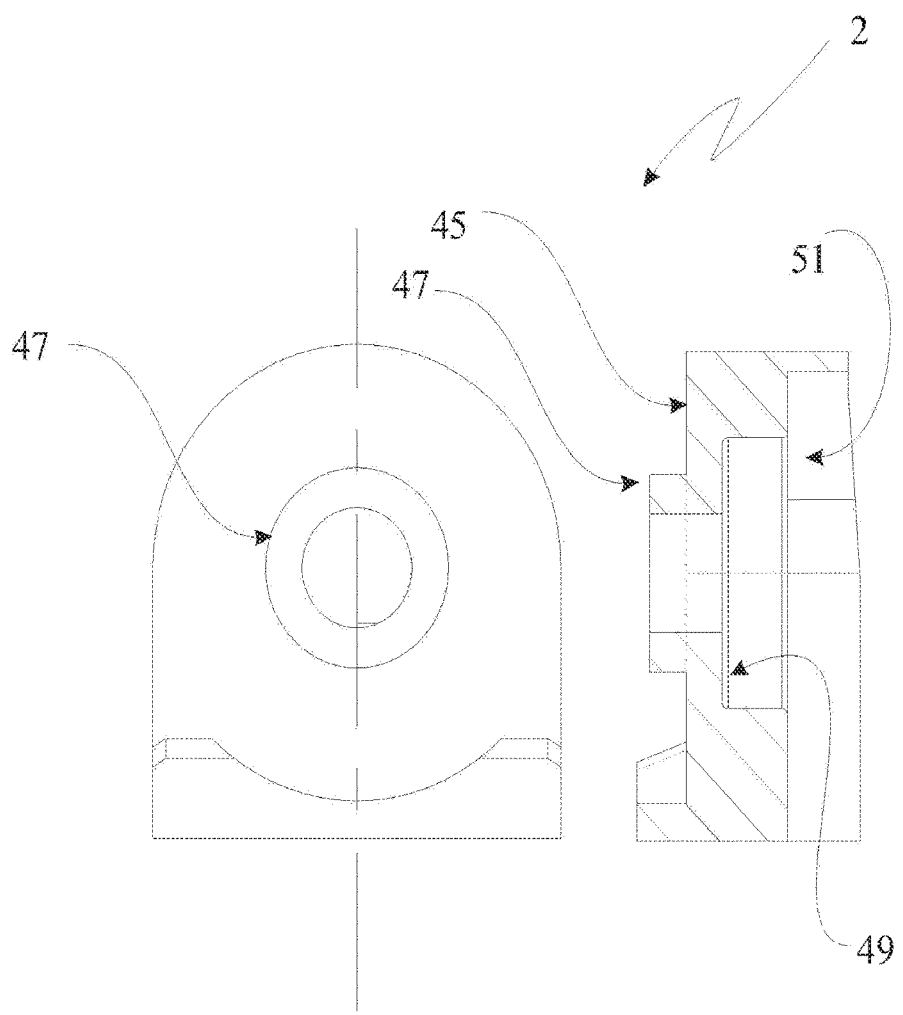
FIGS. 12 and 13 are the elevation and sectional view of the plate holder of the safety device in accordance with this invention as shown in FIG. 1.

Referring to FIGS. 12 and 13 the holding member (2) of the safety device for the side stand of a two wheeler(100) is an arcuate member provided with a circular opening defining a first surface (45) provided with an integral coaxial annular disc (47) adapted to engage and coaxially locate the holding member (2) in the cylindrical locating region (35) of the cylindrical projection (31) provided on the housing (4) of the safety device for the side stand of a two wheeler(100).

The holding member (2) further defining a circular cavity (49) adapted to coaxially locate the a fastener element (7) and an arcuate cut out (51) adapted to locate the support element (6).

Figure 14:
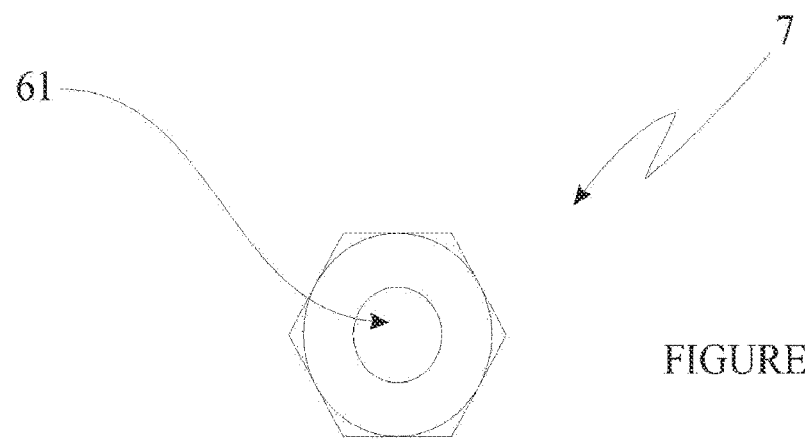
FIGS. 14 and 15 are the plan and elevation of the fastener of the safety device in accordance with this invention as shown in FIG. 1.
Figure 15:
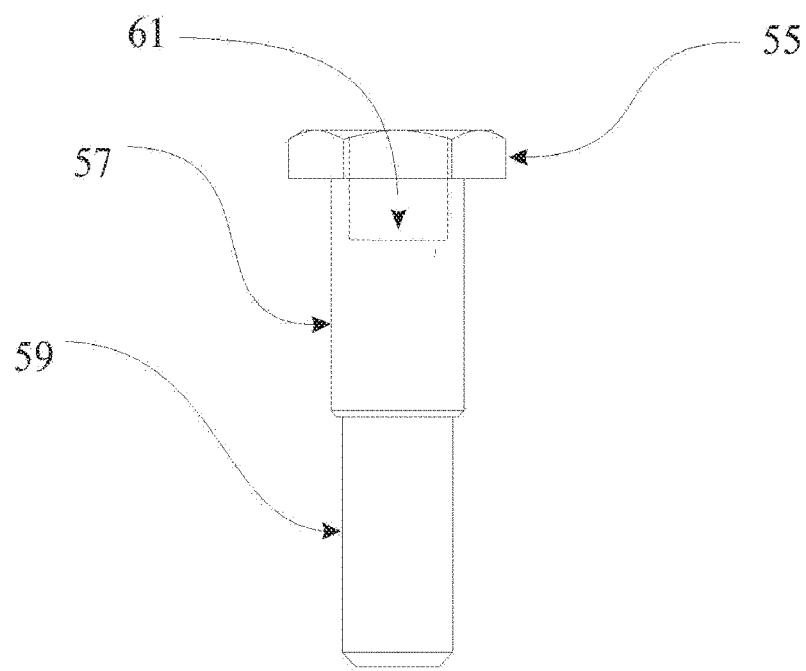

Referring to FIGS. 14 and 15 the fastener element (7) is provided with an hexagonal profile (55) at one end of a cylindrical surface (57) and adjoining threaded end (59). The fastener element (7) is also provided with a central cylindrical cavity (61) at the hexagonal end. In an assembled configuration of the safety device for the side stand of a two wheeler(100) the cylindrical cavity (61) is adapted to receive the cylindrical locating region (37) of the cylindrical projection (31) provided on the housing (4).

Figures 16, 17:
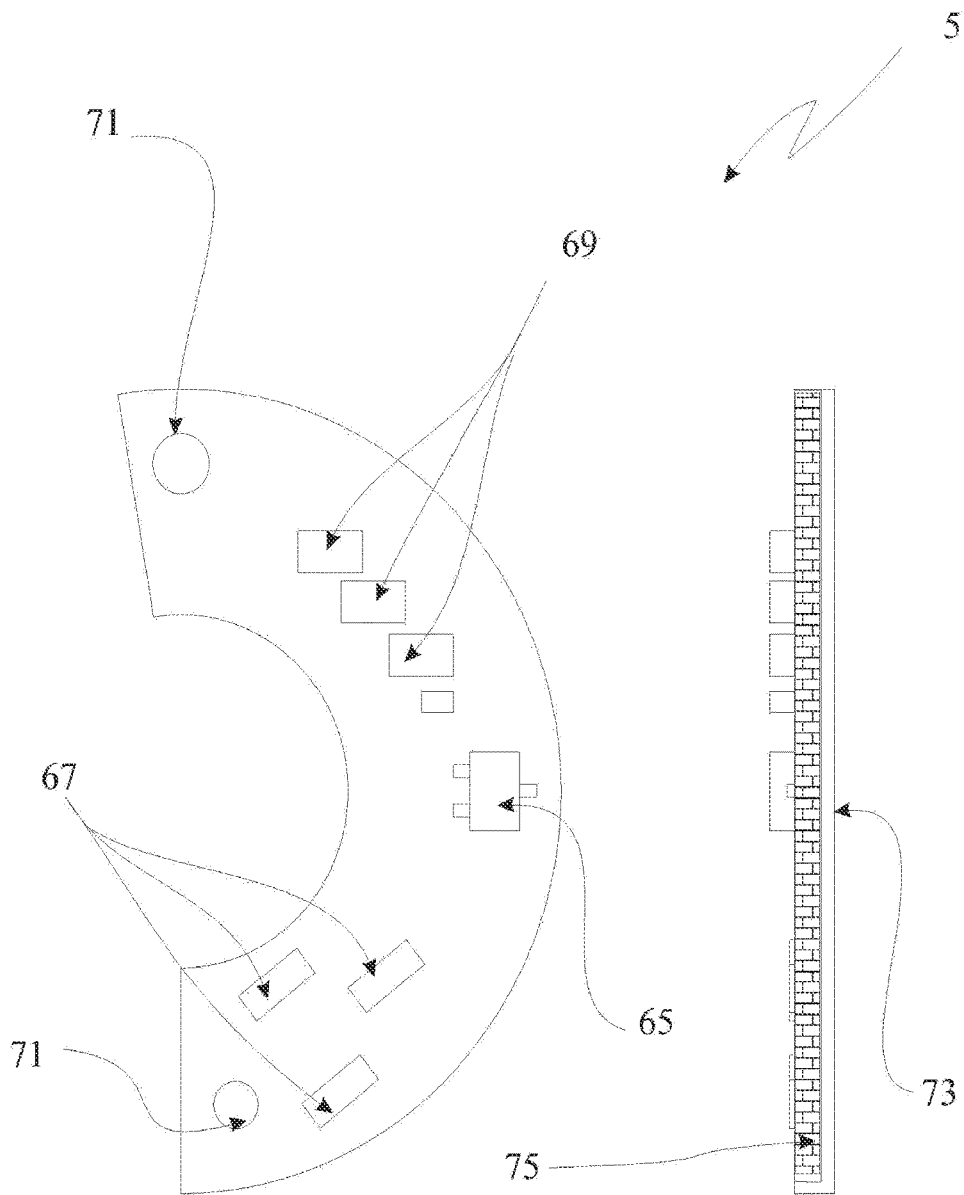
FIGS. 16 and 17 are elevation and end view of the printed circuit board of the safety device in accordance with this invention as shown in FIG. 1.

Referring to FIGS. 16 and 17 the integrated circuit unit (5) is a substantially semicircular disc having a central cutout. the components of the integrated circuit unit (5) include a sensor unit (65) resistors and capacitors (69) and pad connector points (67) for conducting the signal generated by the sensor unit (65) to a controller unit (not included in this invention) adapted to read the signal received and generate audio or visual alerts and prevent engine start of the two wheeler engine. The integrated circuit unit (5) is also provided two mounting location holes (71) complementary to the spaced apart locating pins (39) provided on the circular disc (25) of the housing (4). These mounting location holes (71) accurately locate the integrated circuit unit (5) within the housing (4), maintaining the relative angular location of the sensor unit (65) with reference to the move-able element which is rigidly secured to the holding member (2). The printed circuit board is mounted on a rigid polymer base (73) and covered with protective coating (75) The cylindrical locating regions (33) (35) provided on the central cylindrical projection (31) of the housing (4) locate and maintain the positional accuracy and the air gap between the sensor unit (65) and the move-able element (3).

The sensor unit (65) typically is a complementary metal oxide semiconductor (CMOS) Hall sensor having facility to switch the direction of current through the Hall elements thereby eliminating the offset errors typical of semiconductor Hall elements. Other features like preset-able functional characteristics like gain, offset, temperature coefficient of gain (to compensate different magnetic materials thermal dependencies) provides programmable algorithms for complex signal processing in real time.

In this invention a change in the magnetic flux intensity causes a protected, magnetically biased pre-programmed sensor to go in a precise switch mode. The switching and hysteresis is controlled by the profile of a ferrous strip positioned accurately with controlled air gap between the face of the ferrous strip face and the sensing location of the sensor. A Complementary metal-oxide-semiconductor (CMOS) type Hall effect sensor was used. The Hall effect switch was mounted on a sturdy printed circuit board having a bias magnet, short circuit, reverse polarity protection and with a metal-oxide-semiconductor field-effect transistor (MOSFET) for output indication. The sensor used has wide operational parameters, with an operating voltage range of 2.7V to 24V, a magnetic latch range of ±0.4 mT to ±80 mT and a magnetic switch range of ±1.5 mT to ±66 mT and a programmable hysteresis range between 1 mT and 36 mT. The negative thermal coefficient can be adjusted in the range of 0 to −2000 ppm/° C. to match all currently available permanent magnet materials or to use with electromagnet (current sensing) actuation. This device has an operational temperature range spanning −40° C. to +50° C., making it highly suited for use in demanding automotive or industrial environments.

Figure 18:
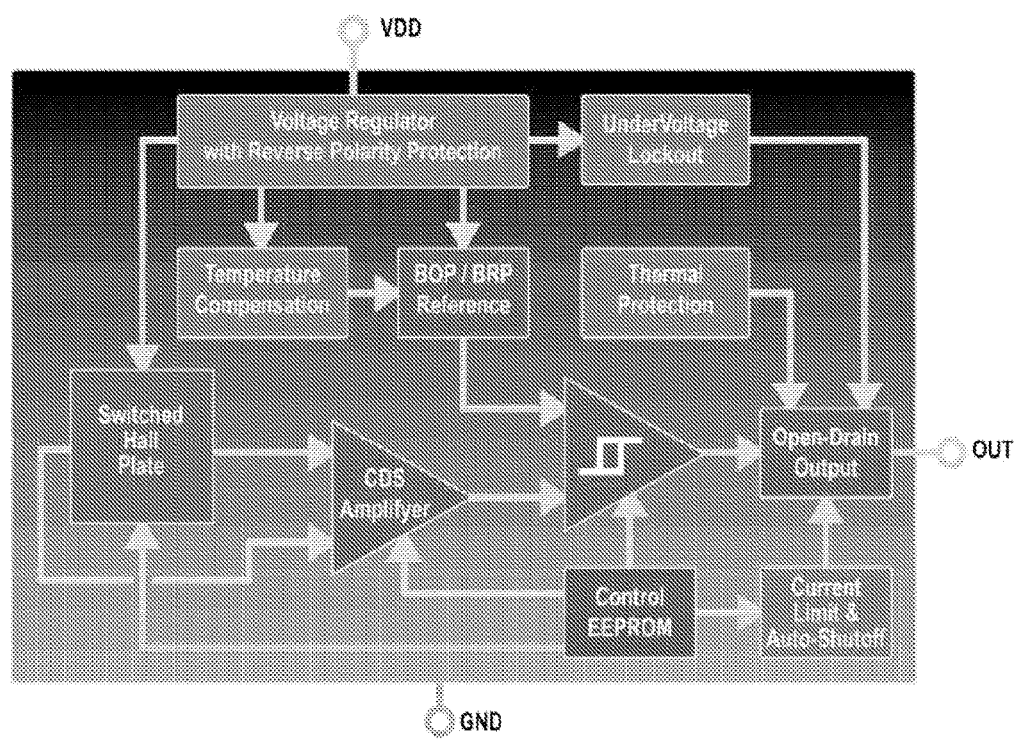
FIG. 18 is the functional diagram of the programmable mixed signal CMOS technology Hall-effect sensor used in the safety device in accordance with this invention as shown in FIG. 1.

The Hall effect sensor used for testing the invention was a "Melexis" programmable unit. Referring to FIG. 18 the functional diagram of the programmable Hall-effect sensor provided with mixed signal CMOS technology, includes a voltage regulator, Hall sensor with advanced offset cancellation system and an open-drain output driver, all provided in a single package. The sensor is provided with built-in reverse voltage protection therefore a serial resistor or diode on the supply line is not required and the sensor function effectively at low voltage operation down to 2.7V while being reverse voltage tolerant. In the event of a drop below the minimum supply voltage during operation, the under-voltage lock-out protection will automatically freeze the device, preventing the electrical perturbation to affect the magnetic measurement circuitry. The open drain output is fully protected against short-circuit with a built-in current limit. An additional automatic output shut-off is activated in case of a prolonged short-circuit condition. A self-check is then periodically performed to switch back to normal operation if the short-circuit condition is released. The on-chip thermal protection also switches off the output if the junction temperature increases above an abnormally high threshold. It will automatically recover once the temperature decreases below a safe value.

The advantages of this invention includes:

1. There are no wear and tear of the components used in the device as the sensing the position of the side stand and generating appropriate signal is fully contact less. This ensures error free sensing in more than one million repetitions.

2. The components of the device are fully enclosed in a dust and weather proof housing ensuring maintenance free operation.

3. The extent of angular displacement and locational accuracy is controlled by the complementing projections and openings provided in the housing.

4. The air gap between the moveable and the fixed components within their entire range of angular displacement is constant. This ensures non varying signal generation repeatedly.

5. This device may be fitted on varying models and types of two wheelers as modification is required only in the base plate that is used for mechanical fitment. Within the same model or type of two wheeler the variations of vehicle body part and side stand does not adversely affect on the switching performance. This makes the fitment of the unit to the vehicle easy requiring low skill levels.

6. As the sensor unit is pre-programmable, over a wide range of design variables as required for different models and types of two wheelers, the inventory cost in manufacturing is reduced considerably and the device is highly suitable of for just-in-time inventory management practice at the vehicle assembly line.

While considerable emphasis has been placed herein on the particular features of "a device for providing improved safety in using a side stand for parking the two wheeled vehicle" and the improvisation with regards to it, it will be appreciated that various modifications can be made, and that many changes can be made in the preferred embodiment without departing from the principles of the invention. These and other modifications in the nature of the invention or the preferred embodiments will be apparent to those skilled in the art from the disclosure herein, whereby it is. to be distinctly understood that the foregoing descriptive matter is to be interpreted merely as illustrative of the invention and not as a limitation.

We claim:

1. A device, for enhancing safety in the use of a side stand of two wheeled vehicle, said device comprising:
   i) a base plate adapted to be fastened to a frame of a two wheeled vehicle between the wheel centers, said base plate provided with a peripheral cut out having two edges and defining an included angle "X" between said edges;
   ii) a holding member defining a first surface, an integral coaxial annular disc, a circular cavity and an arcuate cut out; said holding member pivotably mounted on the base plate;
   iii) a moveable element rigidly mounted on said first surface of the holding member;
   iv) a housing comprising a circular disc having an integral circular side wall defining a cavity, the housing provided with a central cylindrical projection extending perpendicular to the circular disc; said central cylindrical projection defining at least three cylindrical locating regions; said circular disc provided with at least two spaced apart locating pins; said housing removably fastened to the base plate;
   v) an integrated circuit unit comprising a sensor unit, resistors, capacitors and pad connector points; said integrated circuit unit provided at least two mounting locations; in an assembled configuration, the integrated circuit unit adapted to mount in said housing so as maintain an orientation with reference to a first locating region of the at least three cylindrical locating regions, the mounting locations and said locating pins;
   vi) a support element pivotably mounted on said base plate; said support element adapted to swivel from an inoperative closed position to an operative open position within the included angle "X" of edges and; and
   vii) a fastener element provided with a central cylindrical cavity adapted to pivotably fasten said holding member with reference to the base plate; in an assembled configuration the circular cavity of the holding member adapted to receive the one end of the fastener and the central cylindrical cavity adapted to locate a third locating region of the at least three cylindrical locating regions of the housing so as to maintain the orientation of said moveable member with reference to the sensor unit in the first inoperative swiveled close position and the operative swiveled open position of the support element.

2. A device as claimed in claim 1, wherein the included angle "X" is more than 90 degrees but less than 125 degrees.

3. A device as claimed in claim 1, wherein the moveable element is a permanent magnet selected from a group of permanent magnets consisting of Alnico, Samarium-Cobalt, Neodymium-Iron-Boron magnets.

4. A device as claimed in claim 1, wherein the integrated circuit unit is mounted on a rigid polymer base and covered with protective coating.

5. A device as claimed in claim 1, wherein the sensor unit is a programmable digital Hall effect sensor.

6. A device as claimed in claim 1 wherein the device is adapted to be retrofitted to the two wheeled vehicle.

* * * * *